United States Patent [19]
Perry

[11] Patent Number: 6,048,286
[45] Date of Patent: Apr. 11, 2000

[54] BLEED CLOSURES FOR HYDRAULICALLY LIMITED SLIP DIFFERENTIALS

[76] Inventor: Forbes G D B Perry, Long Meadow, Church Street, Charlbury, Oxfordshire, OX7 3PP, United Kingdom

[21] Appl. No.: 09/322,038

[22] Filed: May 28, 1999

[30] Foreign Application Priority Data

Jun. 13, 1998 [GB] United Kingdom .................... 9812723
Jan. 27, 1999 [GB] United Kingdom .................... 9901628

[51] Int. Cl.[7] .................................. F16H 48/26
[52] U.S. Cl. .............................. 475/88; 475/231; 475/248
[58] Field of Search ............................. 475/88, 224, 231, 475/248

[56] References Cited

U.S. PATENT DOCUMENTS

| 3,361,008 | 1/1968 | Fallon | 475/88 |
|---|---|---|---|
| 3,546,969 | 12/1970 | Gibson et al. | 475/88 |
| 3,987,689 | 10/1976 | Engle | 475/88 |
| 4,041,804 | 8/1977 | Clark | 475/88 |
| 5,358,454 | 10/1994 | Bowen et al. | 475/94 |
| 5,888,163 | 3/1999 | Shaffer et al. | 475/88 |

FOREIGN PATENT DOCUMENTS

WO 95/21342 8/1995 WIPO.
WO 95/23931 9/1995 WIPO.

*Primary Examiner*—Sherry L. Estremsky
*Attorney, Agent, or Firm*—Nixon & Vanderhye P.C.

[57] ABSTRACT

A pressure control system for a differential includes an input member and a pair of output members, a pump disposed to be driven in accordance with the difference between the speed of one of the output members and a reference, a chamber which is supplied by the pump, and at least one bleed passage from the chamber. A piston is responsive to hydraulic pressure in the chamber to operate a brake between the one output member and the reference. The bleed passage includes a plunger which is movable against a resilient bias in response to pressure in the chamber. Flow through the passage is blocked when the pressure on the plunger reaches a set pressure.

20 Claims, 9 Drawing Sheets

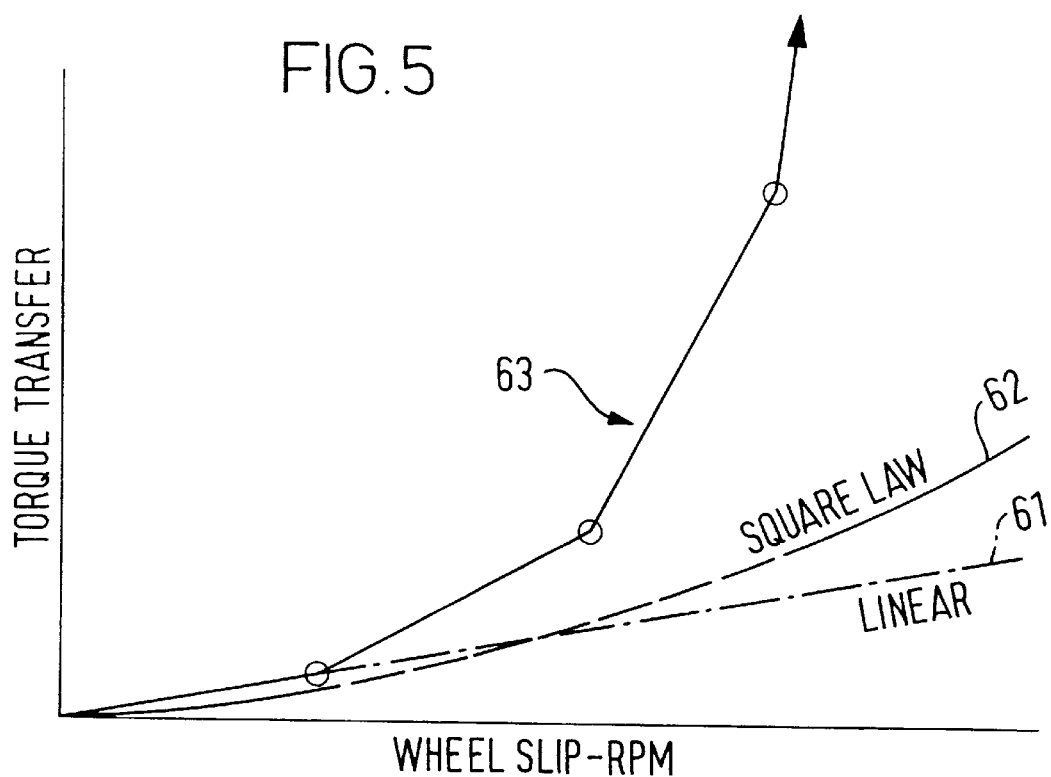
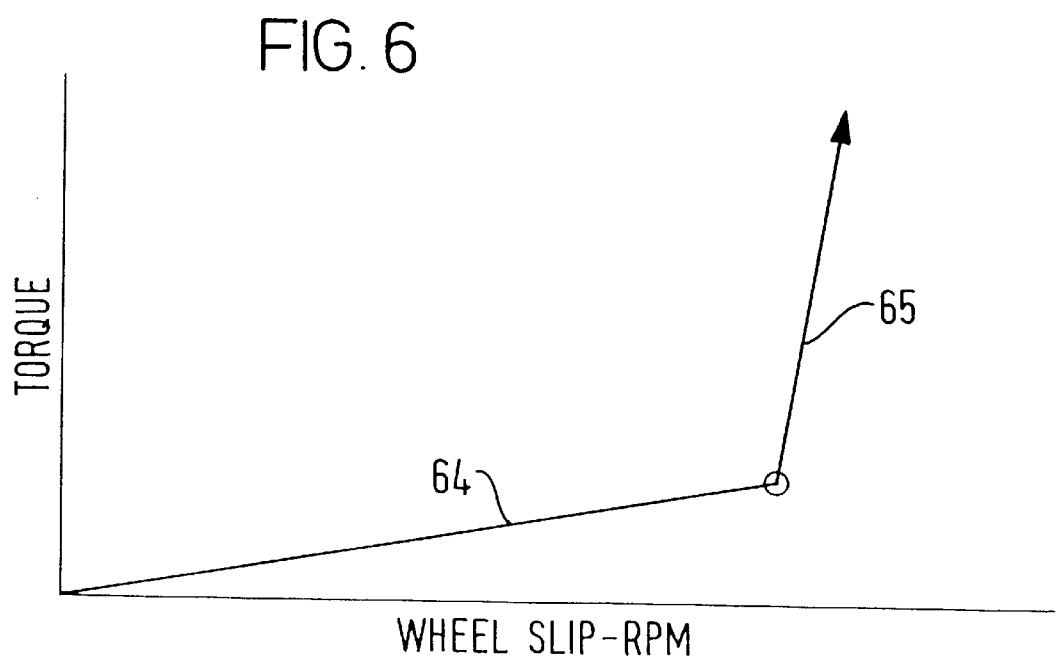

ns $6,048,286

BLEED CLOSURES FOR HYDRAULICALLY LIMITED SLIP DIFFERENTIALS

FIELD OF THE INVENTION

This invention relates to hydraulically limited slip differentials particularly though not necessarily exclusively for vehicles wherein a differential mechanism has two output members each coupled to a pair of wheels or to one of a pair of wheels.

BACKGROUND TO THE INVENTION

The general construction and purpose of differentials for vehicles and other purposes are well known. The present invention particularly relates to differentials in which slip is hydraulically limited, in particular by means of a braking system which includes a pump driven in accordance with the difference in speeds between an output member of the differential and a reference, which may be provided by the driven casing of the differential. In one form of a system of this nature, such a pump provides output pressure to a chamber which contains, preferably, an adjustable bleed orifice and also contains a piston with a bleed orifice. Movement of the piston in response to outlet pressure from the pump operates a brake between the output member and the reference, such as the casing of the differential so as to restrain the output member and normally the wheel connected to it and to transfer torque to the non-slipping side of the differential.

As will be apparent later, the present invention is based on the control of fluid flow through one or more orifices. Flows and pressures through orifices are different according to whether the flow is laminar or turbulent. For large flow velocities where, for example, the Reynolds number is above approximately 2300, the flow is turbulent and the pressure is proportional to the square of the flow. For small flows and small orifices the flow is laminar and the pressure across the orifice is linear with flow. Examples of both types of flow can be found in vehicle hydraulic differentials.

When a vehicle which includes a differential mechanism between a pair of wheels is proceeding normally in a straight line, it is desirable to have an 'open' differential, providing no torque bias or torque transfer. If one of the wheels of a pair starts slipping, a large torque is quickly required to limit the slip and to transfer torque to the non-slipping side. This makes desirable a torque/speed characteristic which increases more rapidly than a natural square law associated with turbulent flow.

Such a torque/speed characteristic and therefore pressure/speed characteristic may be produced by a management of the bleed system associated with a hydraulically limited slip differential.

The present invention is more particularly concerned with an improved, simple and robust arrangement for the management of bleed orifices and consequently the variation of torque in a limited slip differential.

The invention provides a pressure control system for a differential including an input member and a pair of output members and for limiting slip between the output members, the system including a pump disposed to be driven in accordance with the difference between the speed of one of the output members and a reference, a chamber which is supplied by the pump, and at least one bleed passage from the chamber, wherein the bleed passage includes a plunger which is movable against a resilient bias in response to pressure in the chamber to block hydraulic flow through the passage when the pressure on the plunger reaches a set pressure.

The invention also provides a pressure control system for a differential including an input member and a pair of output members and for limiting slip between the output members, the system including a pump disposed to be driven in accordance with the difference between the speed of one of the output members and a reference, a chamber which is supplied by the pump, and at least one bleed passage or channel from the chamber, wherein a plunger is movable against a resilient bias in response to pressure in the chamber to block hydraulic flow through the passage or channel when the pressure on the plunger reaches a set pressure, whereby to provide a piece-wise characteristic for the relationship between torque transfer and slip in the differential.

In some embodiments of the invention the plunger defines one or more bleed passages with an orifice. In other embodiments of the invention the plunger includes an orifice and defines with an adjacent body a bleed passage downstream of the orifice.

BRIEF DESCRIPTION OF THE DRAWINGS

FIG. 5 is a torque/slip diagram for a multiple orifice system;

FIG. 6 is a torque/slip diagram characteristic of a single orifice system;

DETAILED DESCRIPTION

The present invention relates, as previously indicated, to limited slip differentials. Particularly it relates to differentials in which the slip or over speeding of a wheel is limited by a hydraulic system including a pump, wherein the torque transfer is controlled by means of at least one specially designed orifice which while open allows hydraulic fluid to bleed from a chamber, particularly at the output of the pump which is driven, relative to a reference, by one of the output members of the differential.

Figure 2:
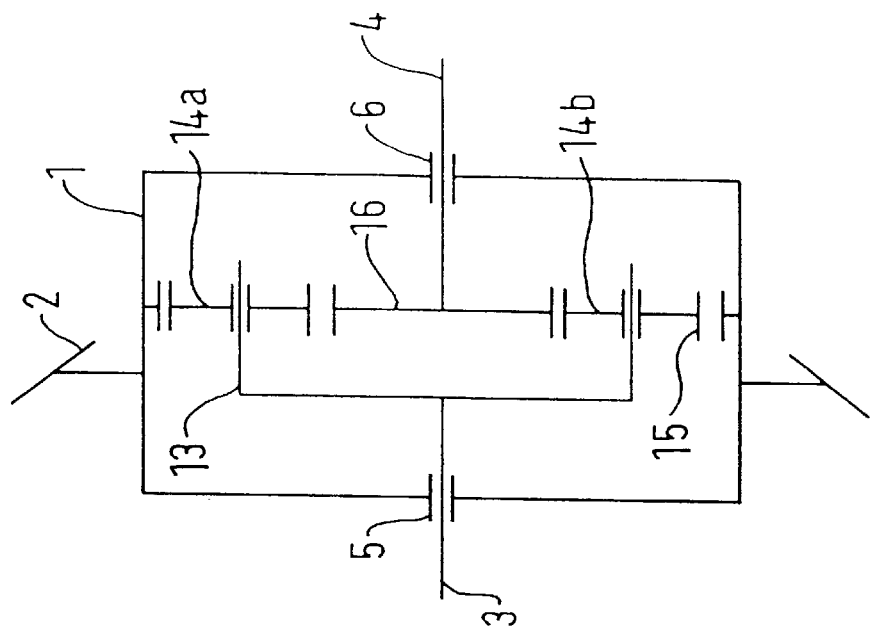
FIG. 2 is a diagram of an epicyclic differential mechanism.
Figure 1:
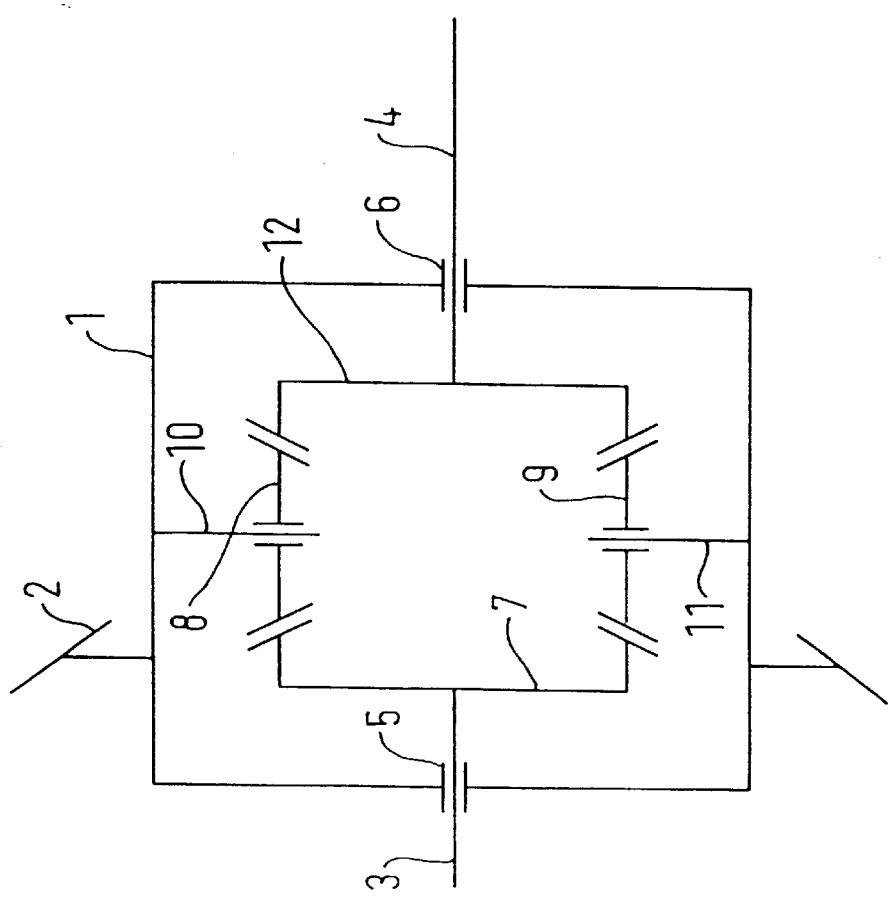
FIG. 1 is a diagram of a bevel gear differential mechanism.
Figure 3:
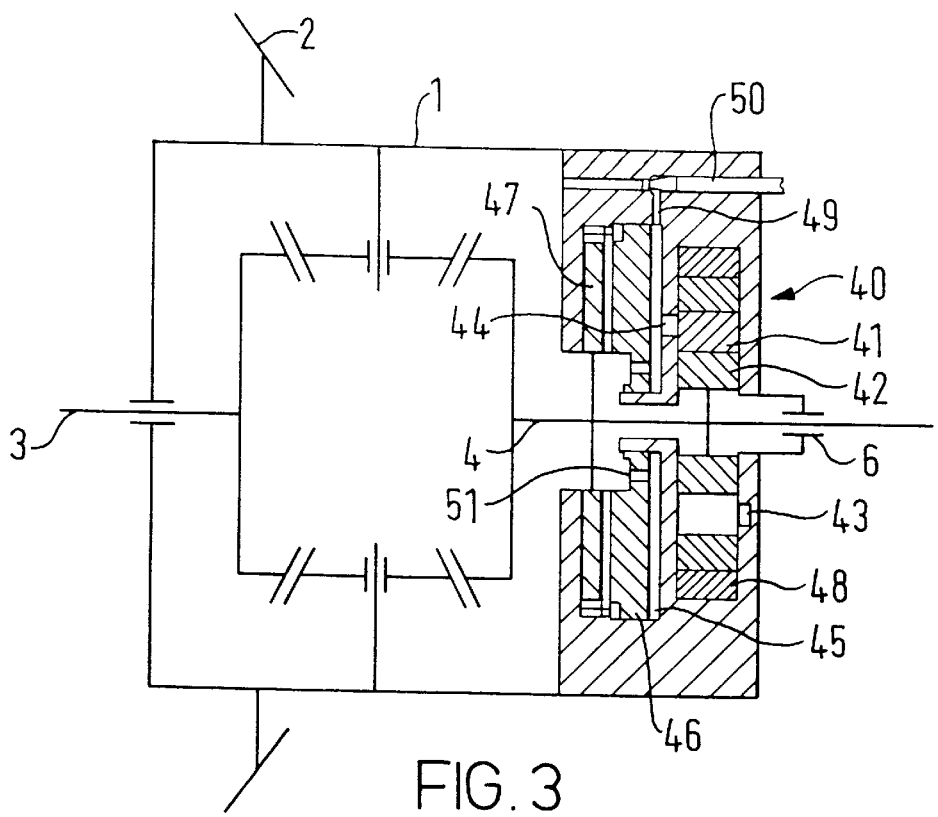
FIG. 3 is a schematic drawing of a bevel differential as shown in FIG. 1 in conjunction with a pumped braking system.
Figure 4:
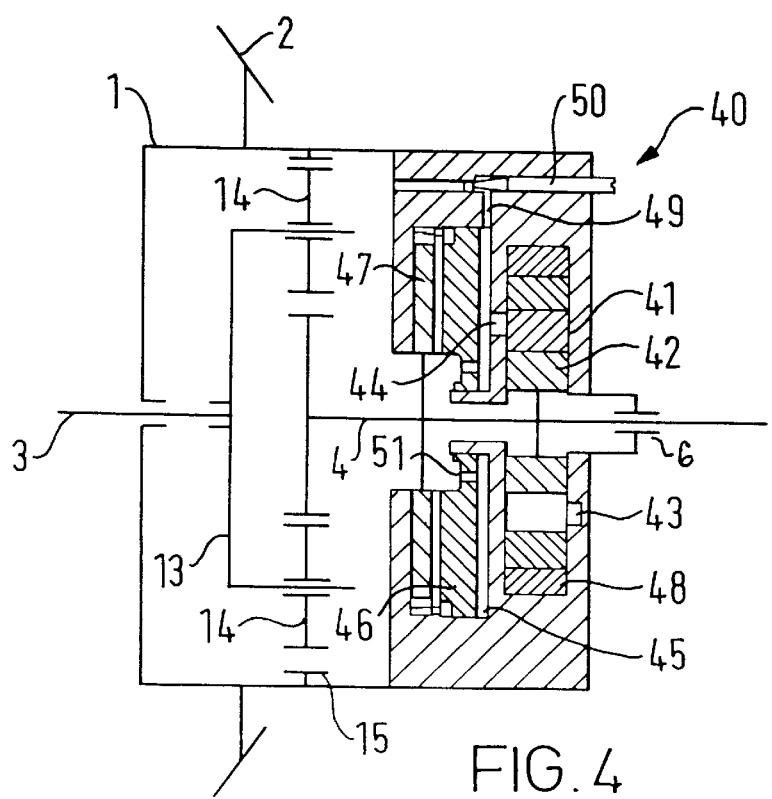
FIG. 4 is a schematic illustration of an epicyclic differential in conjunction with a pumped braking system.

Although differentials exist in a variety of forms, two typical differentials are shown in FIGS. 1 and 2, and in conjunction with a pumped braking system in FIGS. 3 and 4 respectively.

The differential mechanism shown in FIG. 1 includes a casing 1 which may be driven by means (not shown) by way of a gear 2 fixed to the casing 1. In this mechanism the output members are the shaft 3 and the shaft 4. The shaft 3 is journalled in a bearing 5 in the casing and the shaft 4 is journalled in a respective bearing 6 also in the case 1. The shaft 3 is connected to a bevelled gear 7 which meshes with bevelled gears 8 and 9 disposed in diametrically opposite positions and journalled on shafts 10 and 11 attached to the casing 1. Both these bevelled gears are in mesh with a bevel gear 12 carried on the shaft 4.

The operation of such a differential is well known. If there is no relative slip, the output members 3 and 4 rotate at the same speed as the casing 1. A difference in speed of the members 3 and 4 is accommodated by rotation of the bevelled gears 8 and 9.

FIG. 2 illustrates an epicyclic differential which includes a casing 1 with input gear 2 as before. The output member 3 journalled in bearing 5, has at its inner end a planet carrier 13 carrying pairs of planet gears with idler planet gears. One of each pair is in mesh with an annulus or ring gear 15 secured inside the casing 1 and the other meshes with a sun gear 16 which is carried by the output member 4. The drawing shows a planet gear 14a (of one pair) in mesh with the annulus 15 and a planet gear 14b (of another pair) in mesh with the sun gear 16.

For either of the differential mechanisms described, when, particularly used in vehicles, there is no torque bias or transfer between the output shafts 3 and 4 when the vehicle is proceeding straight ahead and the difference in speeds of the shafts 3 and 4 is low or substantially zero. If one of the wheels start slipping, so that for example the output shaft 4 rotates much more rapidly than the output shaft 3 (and necessarily more quickly than the differential casing 1), substantial torques are required to restrain the slip and to transfer torque to the non-slipping side, namely the output shaft 3.

One suitable relationship between torque transfer and wheel slip in revolutions per minute is shown in FIG. 5, wherein curve 61 denotes a linear relationship, curve 62 a square law relationship and curve 63 is a piece-wise curve, of which the various portions may be either square law or linear, representing a desired relationship.

FIG. 6 illustrates the simplest non-linear relationship obtained by using one closeable bleed. The torque/wheel slip relationship being constituted by two portions, a substantially linear portion 64 and a linear but much steeper portion 65. In most circumstances a multi-pieced relationship as shown in FIG. 5 is preferred.

FIGS. 3 and 4 illustrate diagrammatically the differential mechanisms of FIGS. 1 and 2 in association with a pumped braking system. The systems shown in FIGS. 3 and 4 are similar and only that shown in FIG. 4 will be described.

The system shown in FIG. 4 includes the differential already described as reference to FIG. 2 and a pumped braking system 40 which comprises a pump 41 which is driven in accordance with the difference between the speed of the output member 4 and a reference, the reference in this case being the speed of rotation of the casing 1. The pump may have an inner rotor 42 and an eccentric outer rotor mounted in the casing 1 so as to provide, while there is relative motion between the shaft 4 and casing 1 a pump flow between an inlet 43 and an outlet 44. The outlet leads to a chamber 45 which contains a piston 46 that can bear on a brake disc 47 carried by the shaft 4. The pump, which is of known construction, includes a flow reversal ring 48 so that it pumps from inlet to outlet irrespective of the direction of rotation of the shaft 4.

The chamber 45 has in this embodiment at least two bleed passages, a bleed passage 49 which is controlled by a needle valve 50, and at least one bleed passage 51 in the piston. Depending on the design of the passage 51 and the number of such passages, a torque/slip characteristic of the kind shown in FIG. 5 or FIG. 6 can be obtained.

The invention is particularly concerned with ways of managing the closure of one or more bleeds so as to produce varying rates of pressure rise at the output of the pump with pump flow. The designs are based on the effect of the pressure rise on the closure gap of the bleed; thus when pressure rises the closure gap of a bleed begins to decrease against a resilient bias, provided for example by way of a spring. For a constant flow from the pump the decrease in gap will increase the pressure to decrease the gap further, so that there is a cumulative tendency for the bleed passage to snap shut.

Figure 7:
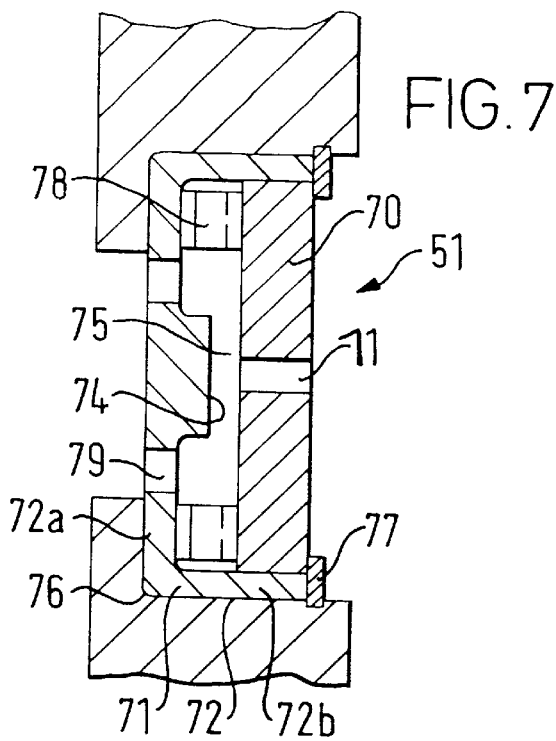
FIG. 7 is an illustration of a pre-set orifice assembly in side section.

FIG. 7 shows an arrangement in which the pressure at which closure occurs is preset by the dimensions and spring rates of the parts in an orifice assembly. FIG. 7 includes a disc-like plunger 70 having an orifice 71 partially closed by a cup shaped closure member 72 having a base portion 72a and a flange 72b. The base portion includes a flat surface 74 which partly defines the closure gap 75 between itself and the plunger. The orifice 71 is preferably entirely defined by the plunger, being inwardly spaced from the periphery of the plunger. The orifice is independent of the position of the plunger (until the plunger closely approaches the surface 74), the pressure across the orifice being in a linear or square law relationship with the flow as previously explained.

The closure member 72 is secured in an annular well 76 in the piston 46 by means of a spring circlip 77, which also serves to restrain movement of the plunger 70 away from the closure member 72. Between the plunger 70 and the closure member 72 is a wavy spring 78. For comparatively low slipping speeds and therefore comparatively low output pressures from the pump, the resistance of the orifice 71 is low and may rise linearly as shown by portion 64 in FIG. 6. As the plunger 70 closely approaches the closure surface 74 so as to narrow the closure gap, there is a rapid rise in pressure because the decrease in the closure gap increases the back pressure for constant flow from the pump. Beyond the point at which the bleed shuts, the braking effort and torque transfer increase rapidly.

The needle-controlled passage 49 in FIG. 4 may be used in parallel with the pressure operated orifice assembly since, depending on the setting of the valve 50, the characteristic shown in FIG. 5 or 6 may be shifted so as to vary the speed associated with a given torque. It may be appropriate to include a relief valve which is set for a maximum torque transfer (and hence pressure) to provide overload protection, particularly in circumstances where the hydraulic fluid (usually oil) is very cold or one may expect very high rates of slip.

Figure 8:
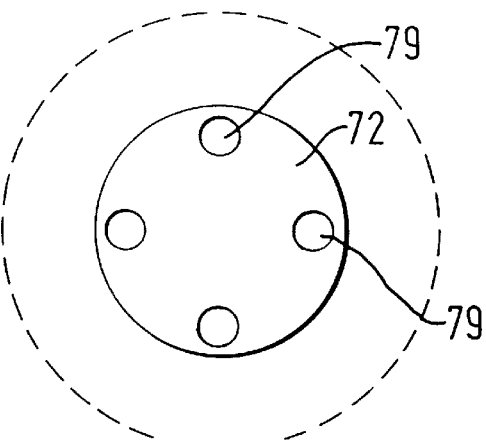
FIG. 8 is an end view of the orifice assembly shown in FIG. 7.

FIG. 8 is an end view of the orifice from the left hand side as shown in FIG. 7. FIG. 8 shows the drain holes 79 in the base of the closure member 72.

Figure 9:
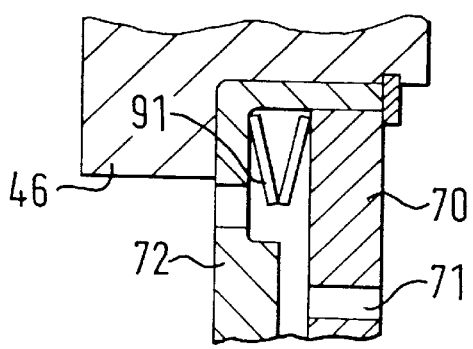
FIG. 9 is an illustration of a modification of the assembly shown in FIG. 7.

FIG. 9 illustrates a modification of the orifice assembly shown in FIG. 7. In this modification the wavy spring 78 has been changed to a conical spring washer or 'Belleville' washers 91.

Figure 10:
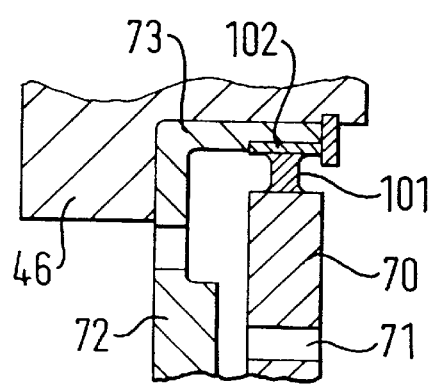
FIG. 10 is an illustration of another modification of the assembly shown in FIG. 7.

FIG. 10 illustrates another modification of the assembly shown in FIG. 7. In this modification the resilient bias is provided by a flexible annulus 101, made of rubber, bonded to the periphery of the plunger and also to an annular insert 102 located in an annular groove on the inner side of a radial flange 73 of the closure member 72. The annulus 101 in this modification also serves to provide a peripheral seal around the moving orifice member, whereas in FIGS. 7 to 9 the plunger and the flange are in a sealing sliding relationship.

The embodiment and various modifications shown in FIGS. 7 to 10 provide a predetermined preset pressure at which closure occurs. The pressure can be preset by the dimensions and spring rates of the various parts. The embodiment is particularly suitable where axial space in the piston is limited. The plunger may provide some degree of viscosity compensation for temperature changes. Alteration of the closure pressure requires dismantling and changing of the spring bias.

Figure 11:
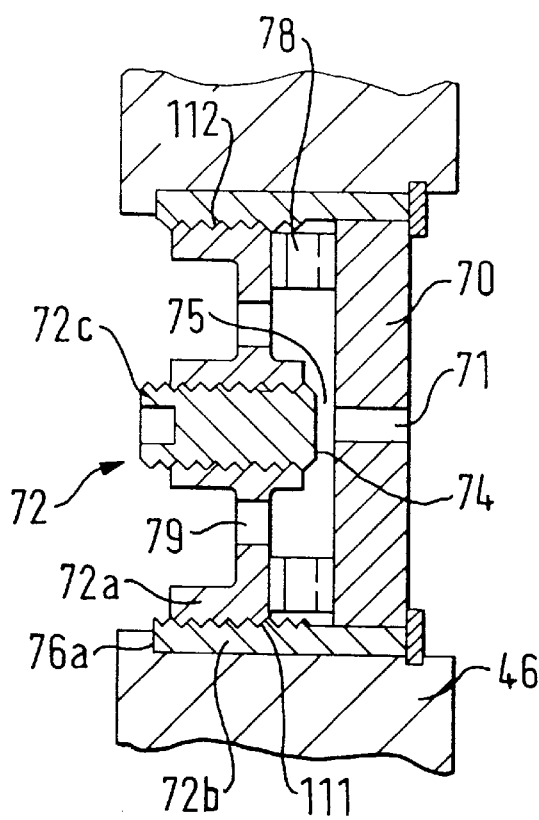
FIG. 11 is an illustration of an adjustable orifice assembly which may be used in the system shown in FIGS. 3 and 4.

FIG. 11 illustrates an embodiment in which the closure pressure can be varied, particularly manually from the rear, non-pressure side even though the plunger 70 may be under pressure.

In this embodiment the closure member 72 is in several parts, including a flanged and apertured base 72a and a cylindrical sleeve 72b which is disposed within the annular well 76 within the aperture in the piston 46. The closure member 72 and the plunger 70 define a closure gap 75 which is closed by abutment of the plunger and the adjacent surface 74 of the closure member 72. The sleeve allows the plunger to slide within it but part of the inside of the sleeve 72b is formed as a screw-thread 111 engaged by a screw thread on the periphery of the base 72a. Thus the closure member can be rotated to alter the compression of spring member 78. The base 72a has a central threaded bore containing a threaded bolt 72c, of which the inner end constitutes the surface 74. The threaded bolt constitutes an adjustable member by means of which the closure gap 75 can be altered.

Figure 12:
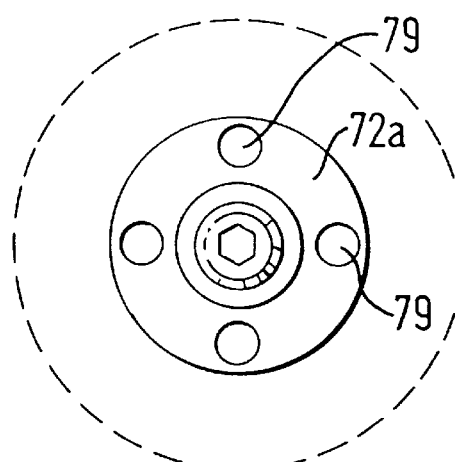
FIG. 12 is an end view of the orifice assembly shown in FIG. 11.
Figure 13:
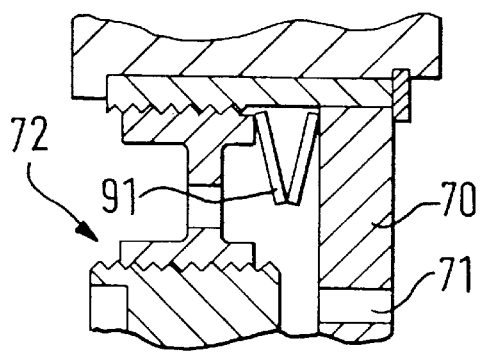
FIGS. 13 and 14 illustrate modifications of the assembly shown in FIG. 11.
Figure 14:
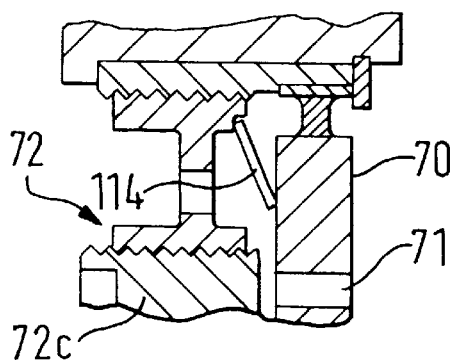

FIG. 12 is an end view of the assembly. FIG. 13 resembles FIG. 9 and illustrates two 'Belleville' washers 91 between the plunger 70 and the closure member 72. FIG. 14 resembles FIG. 10 and likewise illustrates a bonded rubber seal 101 at the periphery of the plunger 70. FIG. 14 also illustrates an additional conical spring washer 114 disposed between the closure member 72 and the plunger 70 to provide extra loading on the plunger.

The foregoing embodiments have, in principle, one orifice for a plunger and so if more complex speed/torque relationships are desired, more than one plunger/orifice combination may be required.

The remaining embodiments of the invention will be described as for use with a differential gear shown in FIG. 4, but may be used with other differential gears such as that shown in FIG. 3.

Thus the embodiments which are now described provide a pressure regulated orifice at the location of the bleed passage 51 in FIG. 4 in order to obtain a desired piecewise linear or non-linear speed-torque relation. These embodiments are based on a single plunger defining or co-operating with a multiplicity of bleed passages.

Figure 15:
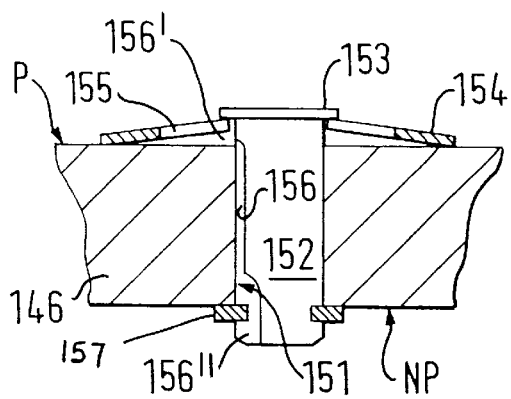
FIG. 15 is a cross-sectional view of an embodiment of a pressure regulated orifice having a plunger with a single bleed channel shown in an open state.
Figure 16:
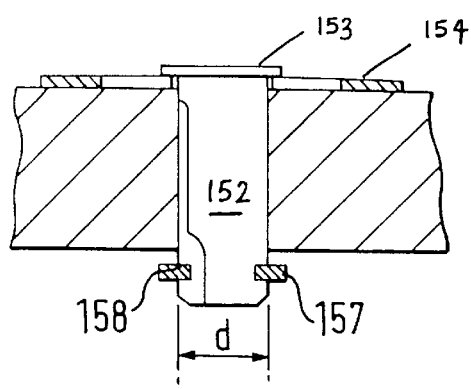
FIG. 16 is a view corresponding to FIG. 15 but showing the plunger in a closed state.
Figure 17:
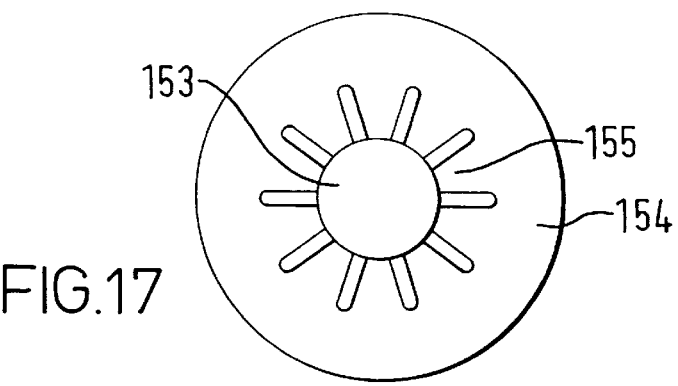
FIG. 17 is a view from the pressure side of the orifice.
Figure 18:
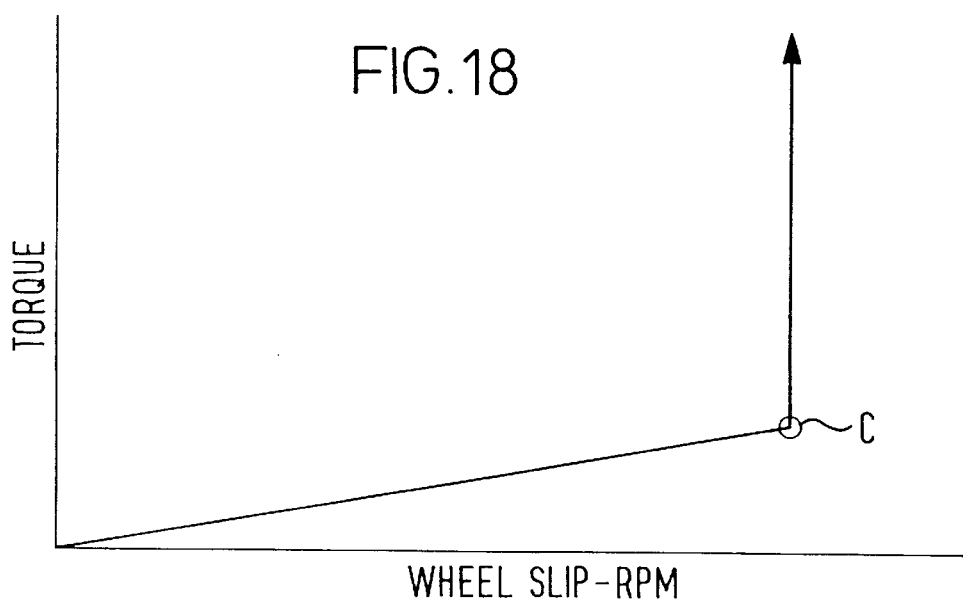
FIG. 18 is a torque/wheel slip curve for the plunger of FIGS. 15 and 16.

An embodiment is shown in FIGS. 15 to 17 and its corresponding speed-torque curve is shown in FIG. 18. An orifice 151 is provided in a body 146, which may be the piston 46 or some other part of an outlet passage of the pump. The body 146 has a pressure side P and a non-pressure side NP.

A plunger 152, close fitting in at least a portion of the orifice 151 and preferably but not necessarily cylindrical, having an outside diameter d (typically 5 to 10 mm) corresponding to the inner diameter of the orifice 151 and having in one end a radially protruding rim or flange 153, is inserted through the orifice 151 from the pressure side P of the body 146. The plunger is also inserted through a spring washer 154 bearing on the surface of the body 146 on the pressure side P and with inwardly protruding fingers 155 on the flange 153.

Starting a distance from the flange 153, a channel 156 (constituting a bleed passage) is cut lengthwise in the periphery of the plunger to open freely at the non-pressure end of the plunger. In a non-pressurized state at the pressure side, the spring washer 154 keeps the flange at a distance from the pressure surface allowing an inlet mouth portion 156' of the channel 156 to be exposed on the pressure side of the body 146 corresponding to at least the cross-section of the remainder of the channel 156. In that position, shown in FIG. 15, a retaining ring (circlip) 157 snapped into a recess 158 (FIG. 16) in the end of the plunger opposite to the flange 153, abuts the non-pressure surface of the structure S. In order not to restrict the free cross-section of the channel by the circlip 157, the channel 156 is cut somewhat deeper when passing the circlip.

Axial travel of the plunger 152 is limited on one hand by the circlip 157 abutting the non-pressure side of the body 146 as shown in the open position of FIG. 15, and, on the other, by the flange 153 pressing the fingers 155 of the flattened spring washer 154 flush onto the pressure surface in closed position shown in FIG. 16.

The distance from the flange 153 to where the channel 156 starts is chosen such that a sufficient sealing length between the inner surface of the orifice 151 and the uncut portion of the plunger 152 is left to provide a fluid seal between the pressure and non-pressure sides of the body 146 when the plunger 152 is in the closed position.

In operation of the pressure regulated orifice 151 shown in FIGS. 15 and 16, a slight pressure increase on the pressure side P of the body 146 will cause a fluid flow through the spaces between the fingers 155 of the spring washer 154 through the inlet mouth portion 156' into the channel 156 and out through an outlet mouth portion 156" on the non-pressure side NP, without affecting the plunger. A further increasing pressure will gradually push the plunger against the force of the spring washer 154 into the orifice 151, thereby eventually positioning the channel mouth 156' below the pressure surface to close the orifice 151 and thereby closing this bleed passage 156.

This course of events is represented in FIG. 18 showing the relation between wheel slip (differential in revolutionary speed between shafts 3 and 4) and torque until the orifice 151 closes. Thereby the differential gear provides maximum torque transfer at the point indicated by a circle C.

Figure 19:
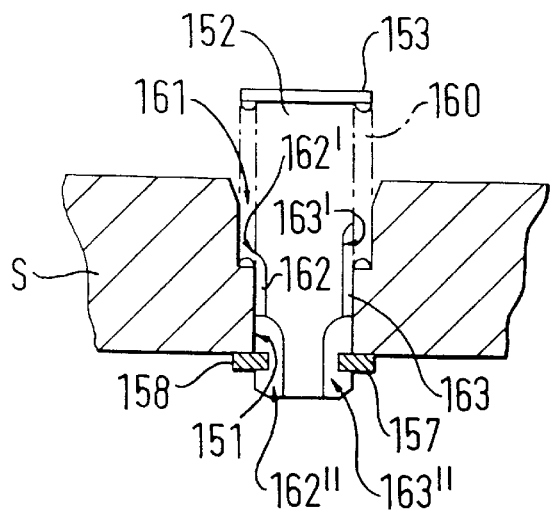
FIG. 19 is a cross-sectional view of another embodiment of a pressure regulated orifice having a plunger with two bleed channels shown in an open state.
Figure 20:
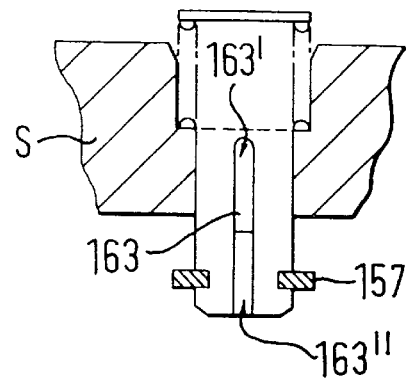
FIG. 20 is a view seen from the right in FIG. 19 showing the plunger in a closed state.

In FIGS. 19 and 20 is shown an embodiment of a plunger 152 having, as before, a flange 153 and in its opposite end a circlip 157 snapped into a recess 158. A helical spring 160 to provide a resilient bias urging the plunger towards its open position shown in FIG. 19. The spring is partly located in and bears on the bottom of a recess 161 formed in the body or wall 146 around the orifice 151 as well as on the flange 153. Plunger travel in the closing direction is limited by contact between adjacent coils of the helical spring.

In this embodiment, the plunger is provided with two diametrically opposed channels 162, 163 starting at different distances from the flange 153. This results in a stepwise diminishing bleed area in that the inlet mouth 162' of the channel 162 closes before the inlet mouth 163' by being lowered past the edge between the recess 161 and the cylindrical wall of the orifice 151, while flow is still allowed through the channel 163. It is preferred to have some axial distance between consecutive mouths 162' and 163', referred to herein as an intermediate dwell, or a stability dwell. In FIG. 20, the respective outlet mouth portions of the channels 162, 163 are marked 162" and 163".

Figure 21:
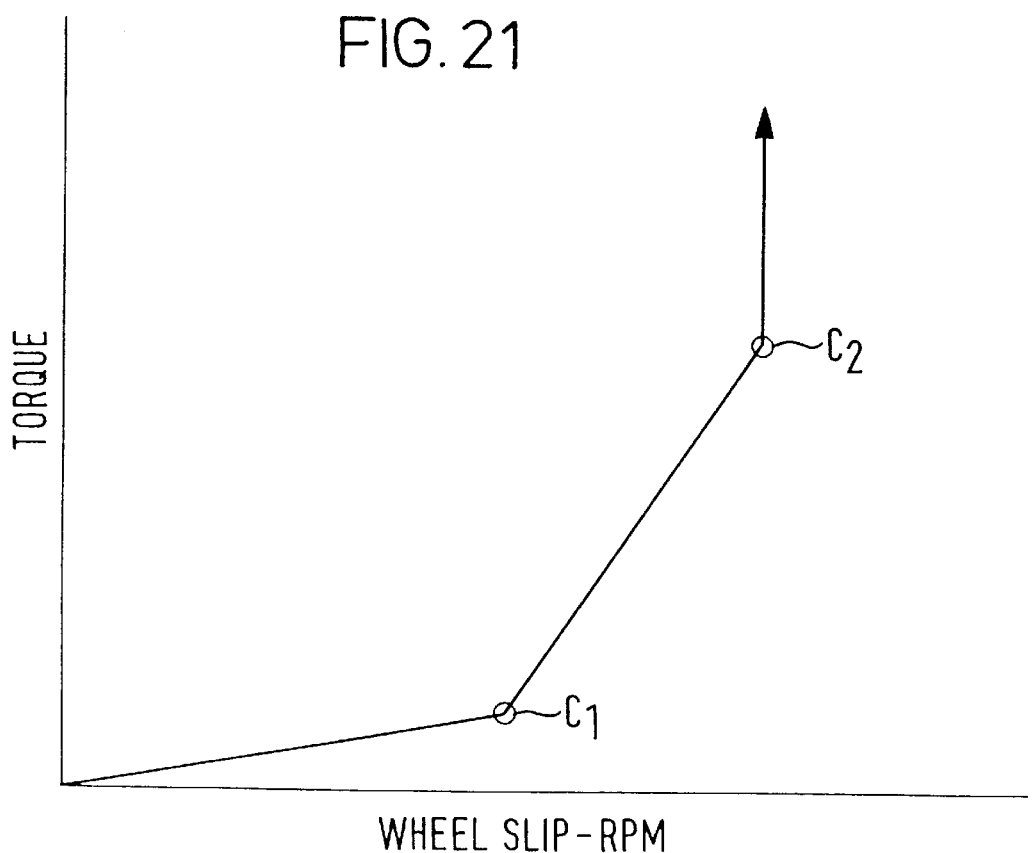
FIG. 21 is a torque/wheel sip curve for the plunger of FIGS. 19 and 20.

As shown in FIG. 21, the provision of two channels results in two inflection points $C_1$, $C_2$ of the speed/torque curve making it smoother than the curve of FIG. 19.

Figure 22:
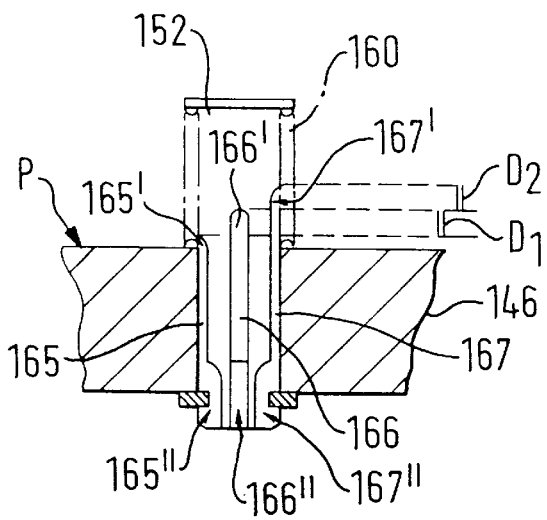
FIG. 22 is a cross-sectional view of yet another embodiment of a pressure regulated orifice having a plunger with three bleed channels shown in an open state.
Figure 23:
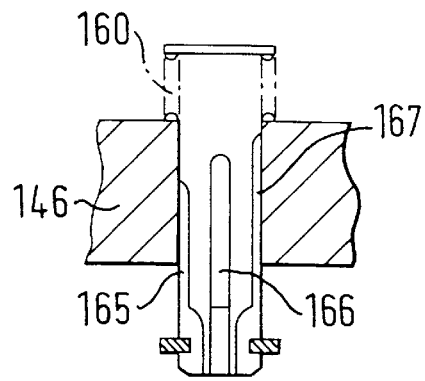
FIG. 23 is a view corresponding to FIG. 22 but showing the plunger in a closed state.

An embodiment of a plunger 152 utilizing three channels 165, 166, 167 having inlet mouth portions 165', 166' and 167', respectively, as well as outlet mouth portions 165", 166" and 167", respectively, is shown in FIGS. 22 and 23. As in the previous embodiment, a helical spring 160 is used to urge the plunger towards its open position shown in FIG. 22. In this case, however, it is assumed that more space is available on the pressure side of the body 146 than in FIGS. 19 and 20, so there is no need to provide a recess for the spring. This also results in a longer sealing bore.

The three channels 165, 166, 167 are 120° angularly spaced, but for the sake of illustration, they are all three shown in FIGS. 22 and 23. FIG. 22 also shows the axial lengths of the two intermediate dwells $D_1$, $D_2$ existing between channels 165, 166 and 166, 167 respectively. In the closed position of the plunger shown in FIG. 23, it is clearly visible that the inlet mouths 165', 166' and 167' of all three channels 165, 166, 167 are well below the edge between the orifice 151 and the pressure side P of the body 146 to provide an adequate seal between the pressure and non-pressure sides of the body 146.

Figure 24:
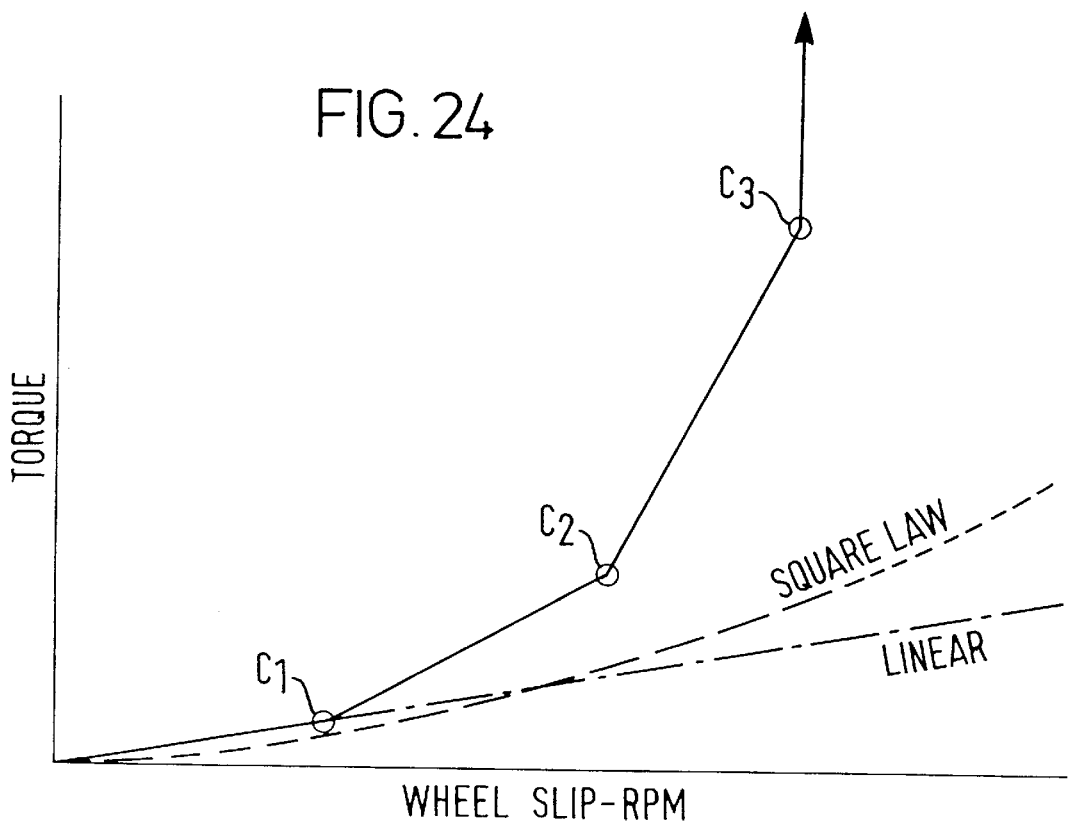
FIG. 24 is a torque/wheel slip curve for the plunger of FIGS. 22 and 23, and as a comparison, a linear and a square law curve.

FIG. 24 shows that the provision of three channels results in three inflection points $C_1$, $C_2$ and $C_3$ of the speed/torque curve making it even smoother than the curve of FIG. 21. In order to illustrate the beneficial results obtained by the present invention, FIG. 24 also shows a linear relation and an alternative square law relation between wheel slip and torque occurring when a traditional bleed orifice is utilized.

Also a single channel could be made with a gradually changing area, e.g. by having a decreasing depth towards the P end of the plunger. However, in order to obtain the inflection points of FIGS. 21 and 24, it would be necessary to provide one or more portions of the channel with a non-sloping bottom corresponding to the intermediate dwells of FIGS. 19 and 22, respectively.

FIGS. 25a to 25e schematically illustrate five further examples of possible embodiments of the present invention.

Figure 25C:
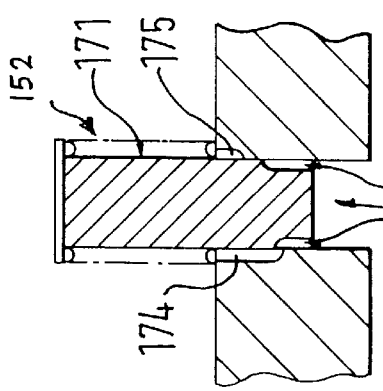
FIGS. 25a to 25e show sections through five further possible variants of co-acting plunger/orifice combinations embodying the present invention.
Figure 25B:
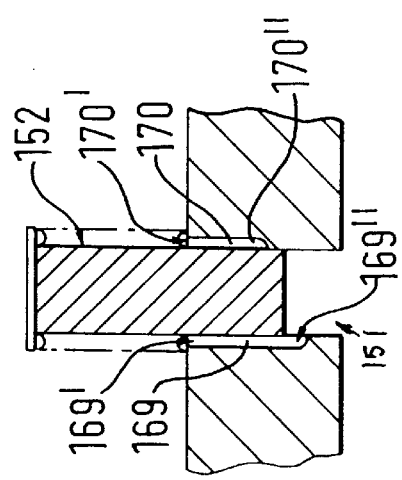
Figure 25A:
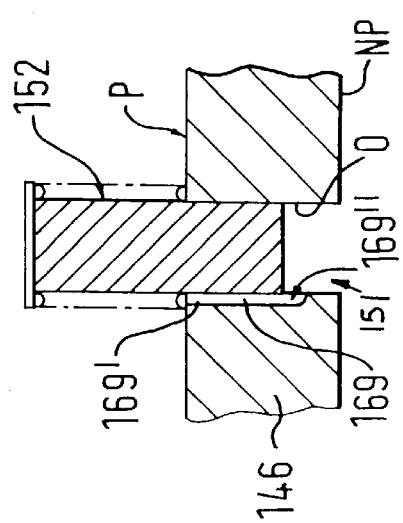

FIG. 25a shows a plunger 152 having an unbroken cylindrical surface and an orifice 151 having one channel 169 provided in the surface of the orifice 151. The inlet end 169' of the channel is at the pressure side P of the body 146 and the outlet end 169" is provided at a distance from the non-pressure side NP of the body 146. The plunger 152 is shown in a position where there is communication between the pressure and non-pressure sides of the body 146 through the channel 169.

FIG. 25b shows the plunger 152 co-operating with an orifice 151 having the channel 169 of FIG. 25a and a further channel 170 opposite to the channel 169. The inlet end 170' of the channel 170 is at the pressure side P of the body or wall 146, whereas its outlet end 170" is provided at a longer distance from the non-pressure side of the body 146 than is the outlet end 169'. The plunger 152 is shown in a position where there is communication between the pressure and non-pressure sides of the body 146 through the channel 169, but where such communication through the channel 170 is prevented because the lower end of the plunger has passed the outlet end 170" of the channel 170.

FIG. 25c shows a plunger 152 having two opposed channels 172, 173 substantially corresponding to the channels 165 and 167 (FIG. 22) provided in its periphery, and further shows two opposed channels 174, 175 substantially corresponding to the channels 169 and 170 (FIG. 25b) provided in the surface of the orifice 151. The plunger is shown in an intermediate position where there is communication between the pressure and non-pressure sides of the body 146 through the channels 174 and 172, whereas such communication through the channels 175 and 173 is blocked.

Figure 25E:
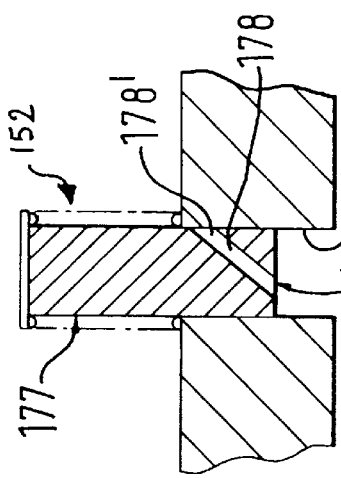
Figure 25D:
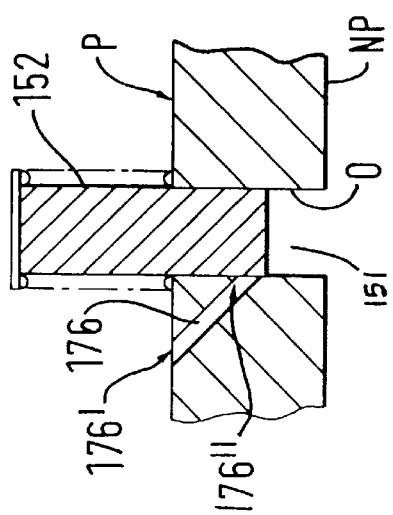

FIG. 25d shows the plunger 152 co-operating with an orifice 151 as before. A channel in the shape of a bore 176 extends from an inlet end 176' at the pressure side P of the body 146 to an outlet end 176" opening in the surface of the orifice 151 at a distance from the non-pressure side NP. The plunger is shown in a position where communication between the pressure and non-pressure sides of the body 146 through the bore 176 is prevented by the lower end of the plunger having passed the outlet end 176" of the bore 176.

FIG. 25e shows a plunger 152 co-operating with an orifice 151 having an unbroken cylindrical surface. A channel in the shape of a bore 178 extends from an inlet end 178' in the periphery of the plunger at a distance from its lower end to an outlet end 178" in the lower end of the plunger. The plunger is shown in a position where communication between the pressure and non-pressure sides of the body 146 through the bore 178 is prevented by the inlet end 178' of the plunger being entirely positioned below the surface of the body 146 at its pressure side P.

I claim:

1. A control system for a differential comprising an input member and a pair of output members and for limiting slip between said output members, the control system including:
   a pump disposed to be driven in accordance with a speed difference between one of the output members and a reference;
   a chamber which is supplied by the pump and includes a piston;
   a brake between the said one member and the reference, said piston being responsive to output pressure from said pump to operate said brake; and
   at least one bleed passage from the chamber, wherein said one bleed passage includes a plunger which is movable against a resilient bias in response to pressure in the chamber to block hydraulic flow through the passage when the pressure on the plunger reaches a set pressure.

2. A system according to claim 1 wherein the plunger entirely defines an orifice and also defines with an adjacent body a closure gap which closes to block flow through the orifice and thereby through the passage.

3. A system according to claim 2 wherein the plunger has a peripheral sealing relationship with a body with respect to which the plunger moves and the orifice is spaced inwardly from the periphery of the plunger.

4. A system according to claim 2 wherein the plunger abuts a closure member to block said orifice.

5. A system according to claim 4 wherein the closure member is adjustable to alter said closure gap.

6. A system according to claim 5 wherein the closure member includes a screw-threaded adjustable member defining the closure gap with said plunger.

7. A system according to claim 4 wherein the closure member is adjustable to alter the resilient bias on said plunger.

8. A system according to claim 7 wherein the closure member is screw-threadingly mounted and the resilient bias is provided at least in part by at least one spring member between the closure member and the plunger.

9. A pressure control system for a differential mechanism comprising an input member and a pair of output members differentially driven from the input member, the system including:
 a pump disposed to be driven in accordance with a speed difference between one of the output members and a reference,
 a chamber which is supplied by the pump and includes a piston which responds to the output pressure of the pump to operate a brake between the said one member and the reference; and
 at least one bleed passage from the chamber;
 wherein a plunger is movable against a resilient bias in response to pressure in the chamber to block hydraulic flow through said passage when the pressure on the plunger reaches a set pressure, whereby to provide a piece-wise characteristic for the relationship between torque transfer and slip between the output members of the differential mechanism.

10. A system according to claim 9 wherein said plunger is received within an orifice to be axially reciprocatingly displaceable along a common boundary of the orifice and the plunger, said resilient bias urging the plunger towards a pressure side of said orifice, a passage being provided in at least one of said plunger and an adjacent body, displacement of said plunger against said resilient bias eventually closing at least one of the inlet and outlet of the passage.

11. A system according to 10, wherein said passage has at least two channels having outlets spaced in the direction of displacement of the plunger.

12. A system according to claim 10, wherein said bias is provided by a spring means disposed between said body and the plunger.

13. A system according to claim 10, wherein the passage is provided in the plunger and said inlet is located at a distance from a rear end of the plunger.

14. A system according to claim 13, wherein said passage has the shape of a recess open towards said common boundary of the orifice and the plunger.

15. A system according to claim 13, wherein said passage has the shape of a bore extending through said plunger from said boundary to one end of the plunger.

16. A system according to claim 13, wherein said passage comprises at least two channels having inlets spaced in the direction of displacement of the plunger.

17. A system according to claim 16, wherein a spacing between said inlets is such that plunger displacement a distance equal to said spacing is due to linear or square law pressure changes from a constant orifice situation.

18. A system according to claim 10, wherein said passage is provided in said adjacent body, and an outlet of said passage is located at a distance from a non-pressure side of the orifice.

19. A system according to claim 18, wherein said passage has the shape of a recess open towards said boundary.

20. A system according to claim 18, wherein said passage has the shape of a bore extending through said body.

* * * * *